(12) United States Patent  (10) Patent No.: US 8,818,938 B2
Maya et al.  (45) Date of Patent: Aug. 26, 2014

(54) SYSTEM, METHOD AND COMPUTER PROGRAM PRODUCT FOR SYNCHRONIZING ENTITIES WITHIN A SYSTEM

(75) Inventors: Luis Maya, Palo Alto, CA (US); Zuye Zheng, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 324 days.

(21) Appl. No.: 13/018,311

(22) Filed: Jan. 31, 2011

(65) Prior Publication Data

US 2011/0246417 A1  Oct. 6, 2011

Related U.S. Application Data

(60) Provisional application No. 61/320,190, filed on Apr. 1, 2010.

(51) Int. Cl.
| | | |
|---|---|---|
| *G06F 7/00* | (2006.01) | |
| *G06F 17/00* | (2006.01) | |
| *G06F 17/30* | (2006.01) | |
| *H04L 29/08* | (2006.01) | |

(52) U.S. Cl.
CPC ...... *G06F 17/30575* (2013.01); *H04L 29/0854* (2013.01)
USPC .......................................................... 707/610

(58) Field of Classification Search
CPC ................. G06F 17/30575; H04L 29/0854
USPC ........................................................ 707/610
See application file for complete search history.

(56) References Cited

U.S. PATENT DOCUMENTS

| | | |
|---|---|---|
| 5,577,188 A | 11/1996 | Zhu et al. |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |

(Continued)

OTHER PUBLICATIONS

U.S. Appl. No. 60/828,192, filed Oct. 4, 2006.

*Primary Examiner* — Charles Lu
(74) *Attorney, Agent, or Firm* — Zilka-Kotab, PC

(57) ABSTRACT

In accordance with embodiments, there are provided mechanisms and methods for synchronizing entities. These mechanisms and methods for synchronizing entities can enable improved data synchronization, improved data management, etc.

14 Claims, 6 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,209,929 B2 | 4/2007 | Dominguez, Jr. et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0139075 A1* | 7/2004 | Brodersen et al. ............... 707/6 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0005259 A1* | 1/2005 | Avery et al. ................. 717/103 |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0206834 A1 | 9/2006 | Fisher et al. |
| 2007/0266156 A1* | 11/2007 | Wilkins ..................... 709/225 |
| 2007/0271317 A1* | 11/2007 | Carmel ..................... 707/204 |
| 2008/0249972 A1 | 10/2008 | Dillon |
| 2009/0063415 A1 | 3/2009 | Chatfield et al. |
| 2010/0211548 A1* | 8/2010 | Ott et al. ..................... 707/655 |

* cited by examiner

SYSTEM, METHOD AND COMPUTER PROGRAM PRODUCT FOR SYNCHRONIZING ENTITIES WITHIN A SYSTEM

CLAIM OF PRIORITY

This application claims the benefit of U.S. Provisional Patent Application 61/320,190, entitled "Method and system for synchronizing dependent objects in an on-demand service environment," by Maya et al., filed Apr. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to system data, and more particularly to system data synchronization.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Data consistency is a common concern within conventional systems. For example, an entity within a system may contain data related to another entity within the system. It may therefore be desirable to synchronize such related data between the entities. Unfortunately, conventional data synchronization techniques have been associated with various limitations.

Just by way of example, traditional methods of synchronizing data may fail to account for parent-child relationships that may be found within entities of a system. Additionally, traditional methods of synchronizing data may also fail to account for the fact that systems may generate different identifiers for the same data located at different entities of the system. Accordingly, it is desirable to provide techniques that improve data synchronization within systems.

BRIEF SUMMARY

In accordance with embodiments, there are provided mechanisms and methods for synchronizing entities. These mechanisms and methods for synchronizing entities can enable improved data synchronization, improved data management, etc.

In an embodiment and by way of example, a method for synchronizing entities within is provided. In one embodiment, information associated with a first synchronization between a first entity and a second entity is received. Additionally, a second synchronization is performed between the first entity and the second entity, utilizing the information associated with the first synchronization. Further, information associated with the second synchronization is stored.

While one or more implementations and techniques are described with reference to an embodiment in which synchronizing entities is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for synchronizing entities.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for synchronizing entities will be described with reference to example embodiments.

Figure 1:
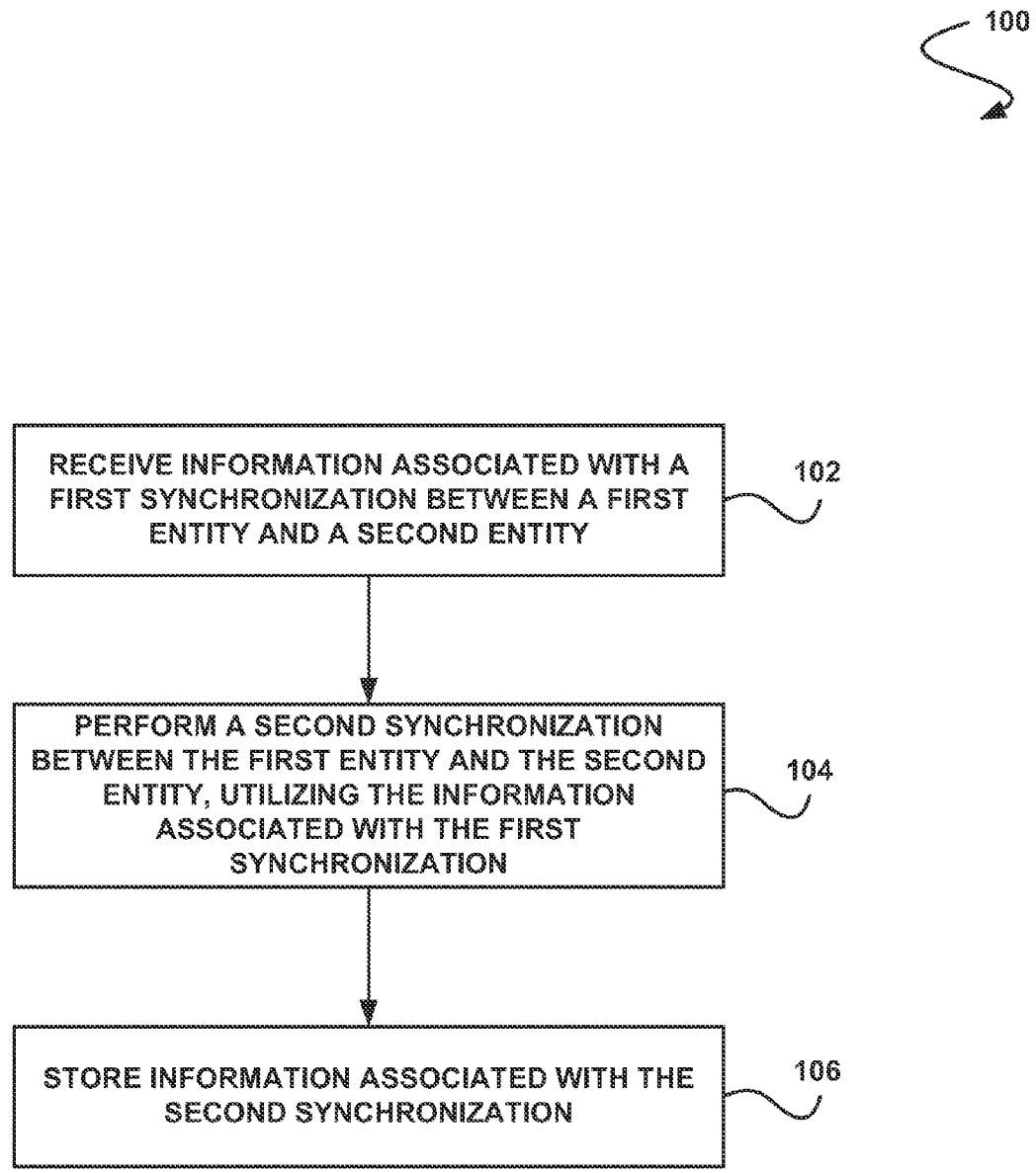
FIG. 1 illustrates a method for synchronizing entities, in accordance with one embodiment.

FIG. 1 illustrates a method 100 for synchronizing entities, in accordance with one embodiment. As shown in operation 102, information associated with a first synchronization between a first entity and a second entity is received. In one embodiment, the first entity and the second entity may each include a data structure found within a system. For example, the first entity and the second entity may include a first organization and a second organization within the system, respectively. In another example, an organization may include one or more accounts within the system, a description of a business or corporation that is a client of the system, etc. In another embodiment, the first entity and the second entity may each include a data structure found within separate systems. For example, the first entity may include a first organization within a first instance of a system and the second entity may include a second organization within a second instance of a system.

Additionally, in another embodiment, the system may include any type of system that contains the first and second entities. For example, the system may include a server, a multi-tenant on-demand database system, etc. In yet another embodiment, the first synchronization between the first entity and the second entity may have been performed at a time prior to the receipt of the information associated with the first synchronization. Also, in yet another embodiment, the first synchronization may include updating data on at least one of the first entity and the second entity such that the first entity and the second entity include the same data.

Further, in one embodiment, the information associated with the first synchronization may include a time when the first synchronization was performed. In another embodiment, the information may include a number of items synced between the first entity and the second entity. In yet another embodiment, the information may be received from a log within one of the entities. For example, the information may be received from a synchronization log located in the first entity or the second entity.

Further still, in another embodiment, the information associated with the first synchronization may be received at an application. In another embodiment, the application may be located at a location separate from the location of the first and second entities. For example, the information may be received at a synchronization application that is separate from the system or systems containing the first and second entities. In yet another embodiment, the information may be received utilizing data encapsulation. For example, the information may be encapsulated and received using a generic data model protocol such as Simple Object Access Protocol (SOAP), Extensible Markup Language (XML), etc.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Furthermore, as shown in operation 104, a second synchronization is performed between the first entity and the second entity, utilizing the information associated with the first synchronization. In one embodiment, performing the second synchronization may include synchronizing one or more data elements between the first and second entities. For example, performing the second synchronization may include synchronizing one or more objects between the first and second entities, one or more fields between the first and second entities, etc. In another embodiment, the second synchronization may be performed by an application. For example, the second synchronization may be performed by an application located at a location separate from the location of the first and second entities.

Additionally, in one embodiment, performing the second synchronization may include determining differences in data between the first and second entities. For example, the differences may include an addition of data in the first entity, a removal of data in the first entity, an alteration of data in the first entity, etc. In another embodiment, differences in data between the first and second entities may be determined for a predetermined time period. For example, a current time may be determined, and differences in data between the first and second entities may be determined for the time period between the time when the first synchronization was performed and the current time. In another embodiment, the time when the first synchronization was performed may be retrieved from the log within one of the entities. In yet another embodiment, the differences in data may be received as a list from the first or second entity. Also, in another embodiment, a number of items synced between the first entity and the second entity during the second synchronization may be recorded (e.g., for statistical purposes, data mining purposes, etc.).

Further, in yet another embodiment, performing the second synchronization may include updating data on at least one of the first entity and the second entity for the time period between the time when the first synchronization was performed and the current time such that the first entity and the second entity include the same data. For example, if one or more changes were made to data at the first entity after the time when the first synchronization was performed (e.g., an addition of data, deletion of data, alteration of data, etc.), then those changes may be made to the data at the second entity.

Also, in one embodiment, the data within the first entity and the second entity may include one or more dependencies (e.g., parent/child relationships, etc.). For example, the first entity and/or the second entity may include one or more objects that are dependent on another object. For instance, at least one of the first entity and the second entity may include a child object (e.g., an individual contact, etc.) that is dependent upon a parent object (e.g., an account that includes the contact, etc.) within that entity. In another embodiment, performing the second synchronization may include synchronizing dependencies between data within the first entity and the second entity such that the first entity and the second entity include the same data dependencies.

Additionally, in another embodiment, the data within the first entity and the second entity may include one or more identifiers. For example, one or more objects in the first entity and the second entity may have corresponding object identifiers. In yet another embodiment, the identifiers may be automatically and/or arbitrarily assigned. For example, the system containing the entity may automatically assign an identifier for each object created within that entity, such that the identifier for an object within the first entity may be different from the identifier for the same object within the second entity.

Furthermore, in one embodiment, performing the second synchronization may include storing identifiers in a data structure (e.g., a dictionary, etc.) separate from the first and second entities. Additionally, in another embodiment, an identifier corresponding to an object within the first entity may be linked (e.g., mapped, etc.) within the data structure to the identifier for the same object within the second entity. In this way, objects from different entities that correspond to each other may be identified within the data structure.

In yet another embodiment, the second synchronization may be performed according to a schedule. For example, synchronization between the first entity and the second entity may be performed every 5 minutes, every 15 minutes, every hour, etc. In this way, the data within the first entity and the second entity may stay synchronized on a regular basis.

Further still, as shown in operation 106, information associated with the second synchronization is stored. In one embodiment, the information may include a time that the second synchronization occurred. Additionally, in another embodiment, the information may include an amount of objects that were synchronized. For example, the information may include the amount of objects that were synchronized between the first entity and the second entity during the second synchronization. Further, in yet another embodiment, the information may be stored at a log within one of the entities. For example, the information may be stored at a synchronization log object located in the first entity or the second entity this way, a synchronization taking place after the second synchronization may be aware of when the second synchronization occurred and may perform a synchronization that accounts for changes in data made after the second synchronization.

Figure 2:
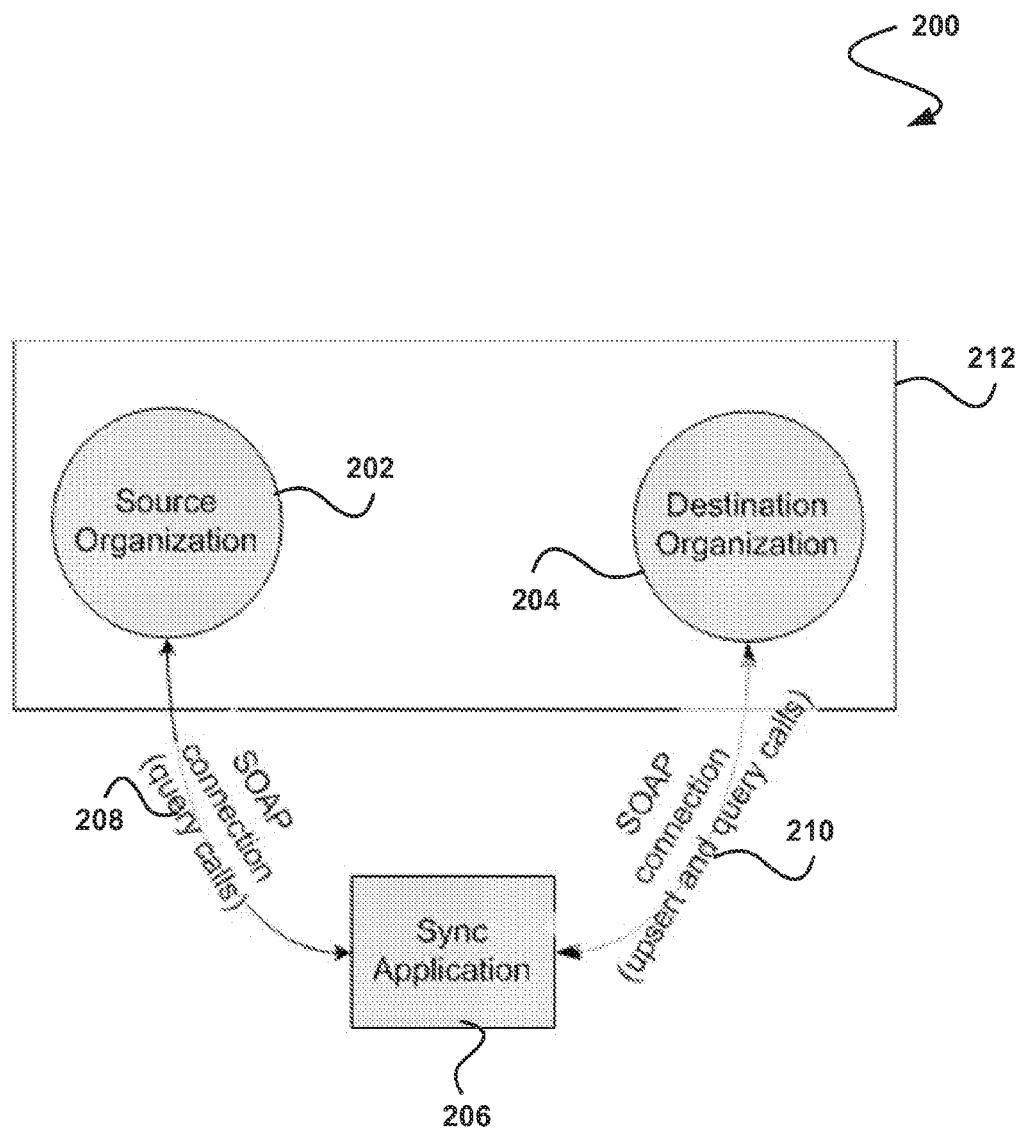
FIG. 2 illustrates an exemplary organization synchronization environment, in accordance with another embodiment.

FIG. 2 illustrates an exemplary organization synchronization environment 200, in accordance with another embodiment. As an option, the present environment 200 may be carried out in the context of the functionality of FIG. 1. Of course, however, the environment 200 may be carried out in any desired environment. The aforementioned definitions may apply during the present description.

As shown, the organization synchronization environment 200 includes a multi-tenant on-demand database system 212. Additionally, the multi-tenant on-demand database system 212 includes a source organization 202 and a destination organization 204. Further, the organization synchronization environment 200 includes a synchronization application 206 separate from the system 212 which is connected to the source organization 202 via a SOAP connection 208 and which is connected to the destination organization 204 via a SOAP connection 210.

In one embodiment, the synchronization application 206 may run on a system and may synchronize data from the source application 202 and data from the destination organization 204 utilizing the SOAP connections 208 and 210. For example, information associated with the alteration (e.g., modification, deletion, addition, etc.) of data in the source organization 202 that occurred after a previous synchronization was performed may be sent to the synchronization application 206, which may in turn perform such alteration on the data of the destination organization 204 such that the data of the source organization 202 matches the data of the destination organization 204. In another embodiment, the synchronization application 206 may synchronize the source application 202 and the destination organization 204 on a periodic basis (e.g., every 15 minutes, etc.).

In yet another embodiment, the data (e.g., one or more objects, etc.) that is synchronized between the source application 202 and the destination application 204 may be allowed to have non-cyclical lookup relationships (e.g., parent/child relationships, etc.) between them. For example, the data synchronized between the source application 202 and the destination application 204 may include data associated with a parent (e.g., an account, etc.) as well as data associated with one or more children (e.g., one or more contacts of the account, etc.). Further, in another embodiment, lookup relationships may be synchronized between the source organization 202 and the destination organization 204. For example, the lookup relationships corresponding to data that is synchronized from the source application 202 to the destination application 204 may keep in the destination organization 204. In this way, both the data and the relationships between the data may be kept synchronized between the source application 202 and the destination application 204.

Figure 3:
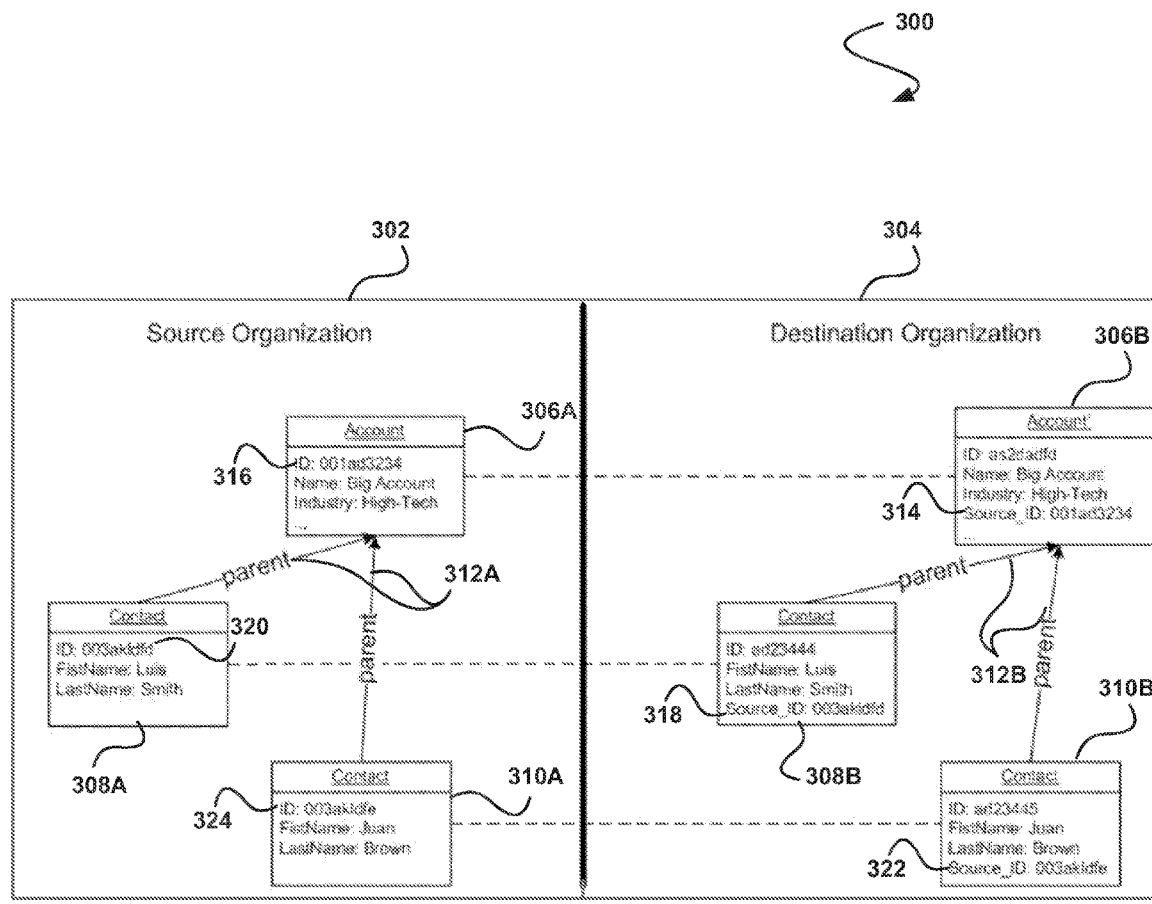
FIG. 3 illustrates exemplary organization data relationships within a system, in accordance with yet another embodiment.

FIG. 3 illustrates exemplary organization data relationships within a system 300, in accordance with another embodiment. As an option, the present system 300 may be carried out in the context of the functionality of FIGS. 1-2. Of course, however, the system 300 may be carried out in any desired environment. The aforementioned definitions may apply during the present description.

As shown, the system 300 includes a source organization 302 and a destination organization 304. Additionally, the source organization 302 includes an account object 306A, a contact object 308A, and a contact object 310A. Further, the account object 306A is represented as a parent in a parent/child relationship 312A with contact object 308A and contact object 310A, which are represented as children. Likewise, the destination organization 304 includes an account object 306B, a contact object 308B, and a contact object 310B corresponding to the account object 306A, contact object 308A, and contact object 310A in the source organization 302, respectively.

Additionally, similar to the objects in the source organization, in the destination organization 304, the account object 306B is represented as a parent in a parent/child relationship 312B with contact object 308B and contact object 310B, which are represented as children. In one embodiment, account object 306A, contact object 308A, and contact object 310A, as well as their corresponding parent/child relationship 312A, may be copied to the destination organization 304 as account object 306B, contact object 308B, and contact object 310B, as well as corresponding parent/child relationship 312B, as the result of synchronizing source organization 302 with destination organization 304. In another embodiment, the children objects may be updated before the parents during synchronization. In this way, the copied records may keep corresponding look-up relationships (e.g., the child/patent relationship, etc.) in the destination organization 304, thereby preserving the data model of the source organization 302.

Further, each of the objects within the destination organization includes source identifiers that link the object to the corresponding object in the source organization 302. For example, account object 306B includes a source ID 314 that corresponds to the ID 316 of the account object 306A of the source organization 302. Additionally, contact object 308B includes a source ID 318 that corresponds to the ID 320 of the contact object 308A of the source organization 302. Further, contact object 310B includes a source ID 322 that corresponds to the ID 324 of the contact object 310A of the source organization 302. In one embodiment, the source identifiers may be included within the objects of the destination organization 304 when such objects are copied during synchronization with the source organization 302.

Figure 4:
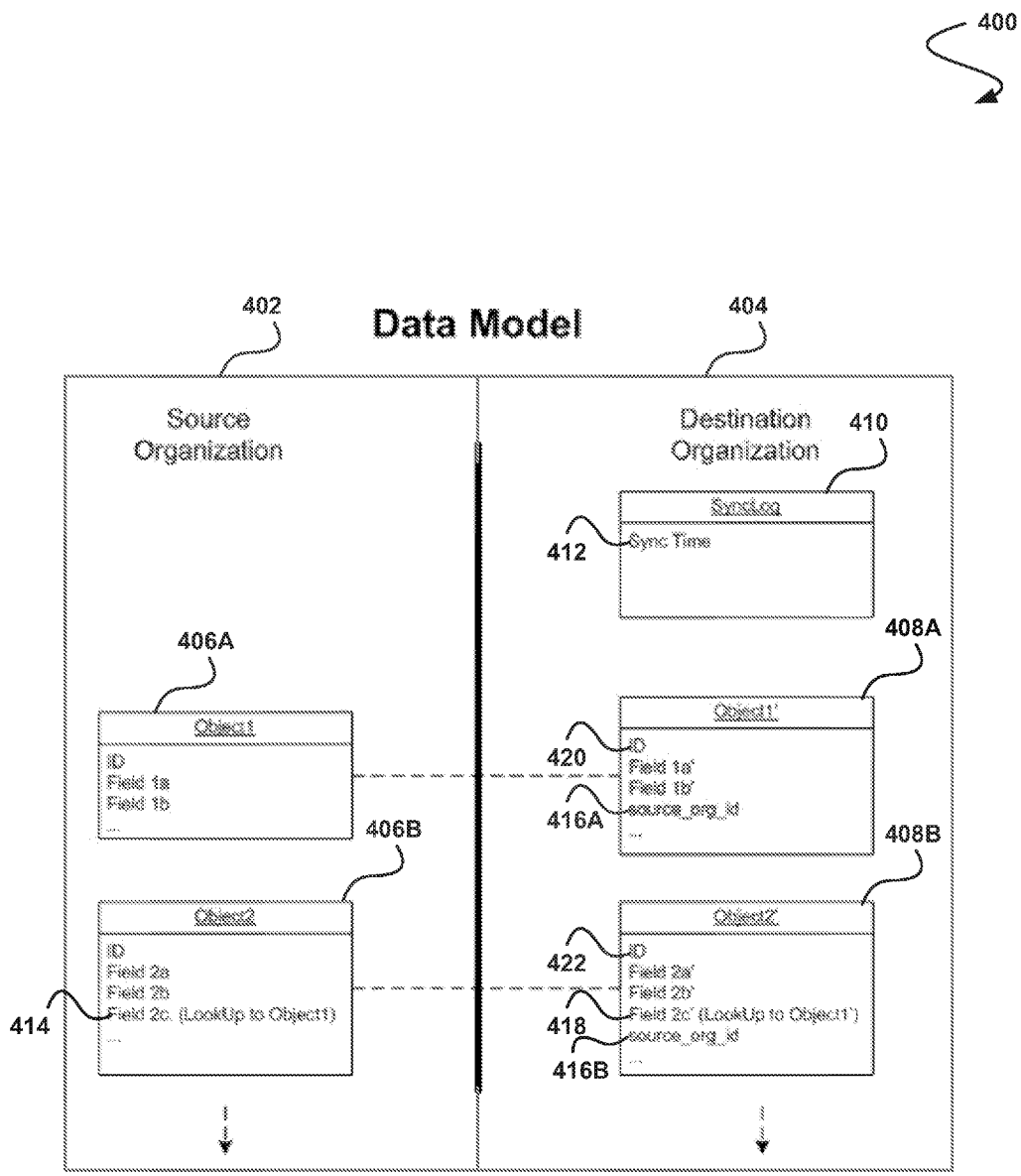
FIG. 4 illustrates an exemplary synchronization data model, in accordance with still another embodiment.

FIG. 4 illustrates an exemplary synchronization data model 400, in accordance with another embodiment. As an option, the present data model 400 may be carried out in the context of the functionality of FIGS. 1-3. Of course, however, the data model 400 may be carried out in any desired environment. The aforementioned definitions may apply during the present description.

As shown, the synchronization data model 400 includes a source organization 402 and a destination organization 404. In one embodiment, the source organization 402 and the destination organization 404 may be located in a single system. In another embodiment, the source organization 402 and the destination organization 404 may be located in separate systems. Additionally, the source organization 402 includes objects 406A and 406B, and the destination organization 404 includes objects 408A and B, as well as synchronization log 410.

In one embodiment, a synchronization application may create a SOAP connection between the source organization 402 as well as the destination organization 404. Additionally, in another embodiment, the synchronization application may query the latest synchronization date and time 412 from the synchronization log 410 of the destination organization 404. In this way, the synchronization application may ensure that only data altered after the last synchronization date and time is updated. Additionally, the synchronization application may save the current time.

Further, in one embodiment, the synchronization application may retrieve a list of modified records in the source organization 402 since the latest synchronization until the current time via the SOAP connection. In another embodiment, the list of modified records may include all records that were updated, added, and removed from the source organization 402. Additionally, in yet another embodiment, it may be determined which of objects 406A and of source organization 402 have a parent. For example, the synchronization application may determine that the first object 406A does not have a parent, since it does not have a field of type lookup, but may determine that the second object 406B does have a parent, since it has a field 414 of type lookup referencing the first object 406A (which is the parent).

In another embodiment, the list of modified records may include a list of objects and fields from the source organization 302 and the corresponding objects and fields in the destination organization 304. Further, the list may be in order of dependency (e.g., if a first object has a lookup to a second object, the second object may be before the first object in the list).

Additionally, in one embodiment, for each field of type lookup that exists in the objects 406A and B of the source organization 402, a list may be created of the identifiers that do not exist in a dictionary (e.g., a data structure kept in memory to keep track of everything that needs to be updated, a hash map, etc.). Further, in another embodiment, the source organization 402 may then be queried for the record identifiers of the missing objects, which may then be added to the dictionary. In this way, missing parent data may be retrieved.

Further still, in yet another embodiment, if it is determined that records of each source object 406A and 406B exists in the source organization 402 but not in the destination organization 404 (e.g., by querying the source organization 402 for identifiers that do not exist in the destination organization 404), a record of each source object 406A and 406B may be locally created at the destination organization 404, and all fields of each object may be filled in. Further, source organization identifier fields 416A and 416B may be set for objects 408A and 408B, such that the organization identifier fields 416A and 416B refer to the source objects 406A and 406B, respectively, at the source organization 402, another embodiment, lookup field 418 may be changed to the corresponding destination identifier 420 for the parent object 408A in the destination organization 404.

Also, in one embodiment, the source organization identifier fields 416A and 416B may be stored in the dictionary along with their corresponding destination organization identifiers 420 and 422. In this way, the dictionary may map the objects from the destination organization 404 to the corresponding objects in the source organization 402. Furthermore, in another embodiment, for each object in the list of modified records, records that were deleted in the source organization 402 may be deleted in the destination organization 404. More specifically, a list of the identifiers of the deleted records in the source organization 402 from the latest synchronization until the current time may be retrieved. Additionally, the identifiers of the corresponding deleted records in the destination organization 404 may be queried. Further, the identifiers of the corresponding deleted records in the destination organization 404 may be grouped (e.g. in batches of 200, etc.) and a delete method may be called in the destination organization 404 in order to delete the records.

Further still, in one embodiment, a new synchronization record (e.g. containing a time and date of the synchronization, a number of objects synchronized, etc.) may be created and inserted into the synchronization log 410 of the destination organization 404. In one embodiment, the new synchronization record may be created only if the synchronization of the source organization 402 and the destination organization 404 was successful. In this way, the synchronization application may know when the synchronization took place when a successive synchronization is scheduled. Also, in another embodiment, the synchronization process performed above may be repeated by the synchronization application according to a predetermined schedule (e.g., every 2 minutes, every 5 minutes, etc.).

System Overview

Figure 5:
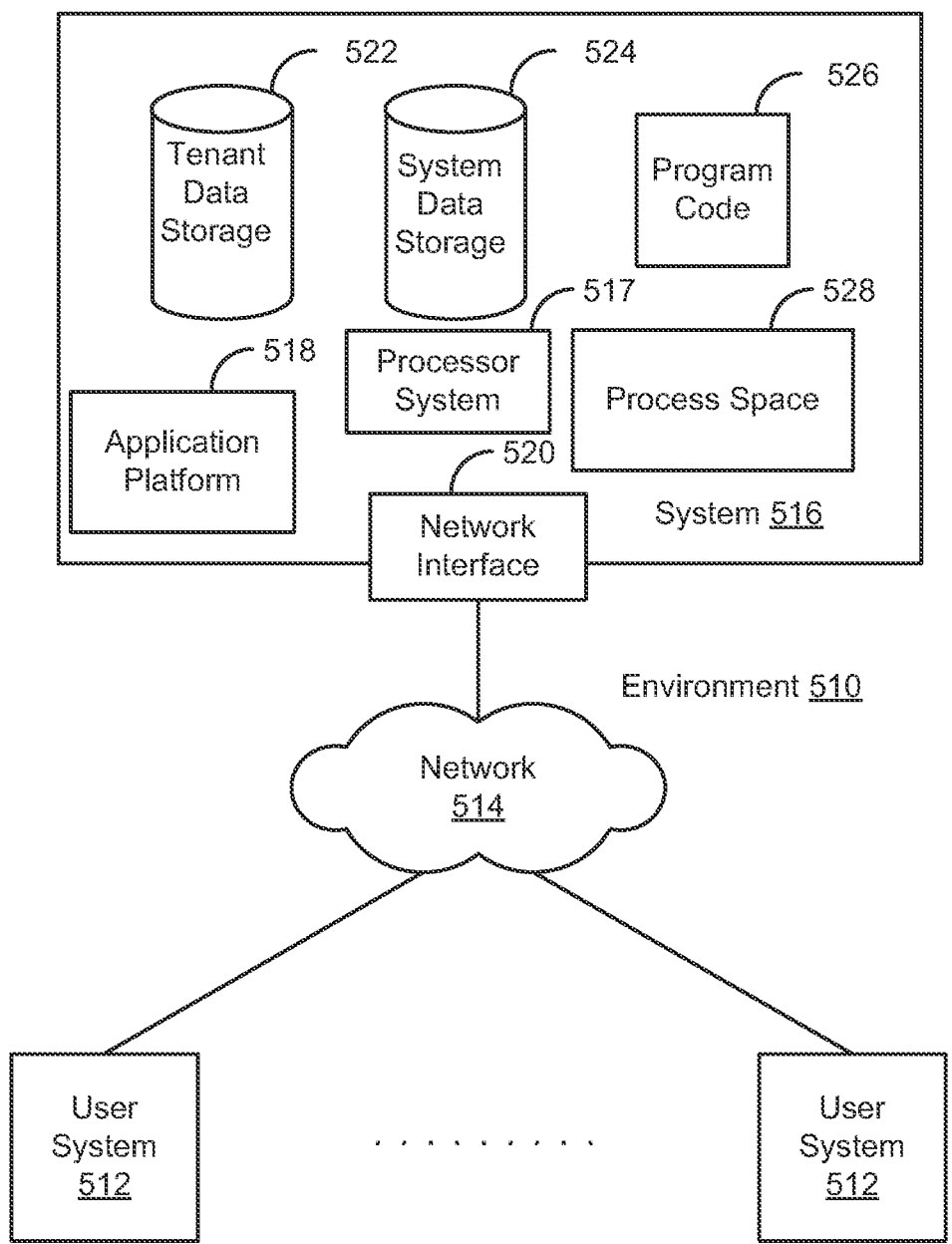
FIG. 5 illustrates a block diagram of an example of an environment wherein an on-demand database system might be used.

FIG. 5 illustrates a block diagram of an environment 510 wherein an on-demand database system might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database system exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database system, which is system 516.

An on-demand database system, such as system 516, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database system 516 may include an application platform 518 that enables creation, managing and executing one or more applications developed by the provider of the on-demand database system, users accessing the on-demand database system via user systems 512, or third party application developers accessing the on-demand database system via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared in certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an NITS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN. LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language. Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
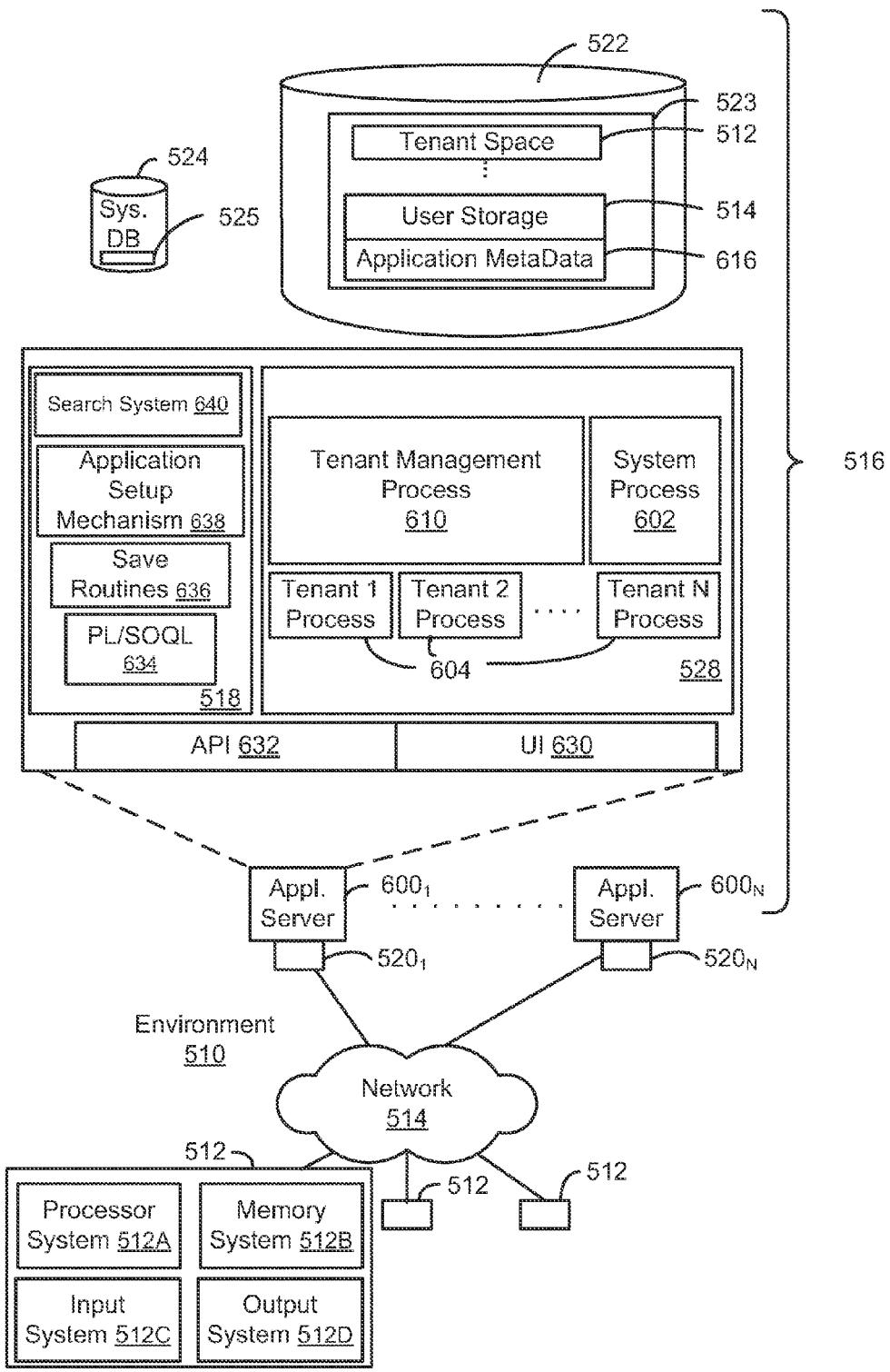
FIG. 6 illustrates a block diagram of an embodiment of elements of FIG. 4 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to cause a computer to implement a method comprising:
    performing a first synchronization of data between a first entity of a first system and a second entity of a second system, the second system being separate from the first system;
    wherein the first synchronization is performed by an application located at a location separate from the first entity and the second entity;
    wherein the performing the first synchronization includes:
        identifying data located at the first entity,
        sending the data to the second entity, and
        storing the data at the second entity;

receiving, by the application, information indicating what data was synchronized during the first synchronization;

performing, by the application, a second synchronization between the first entity and the second entity, utilizing the information associated with the first synchronization, wherein performing the second synchronization by the application includes the application creating a network connection between the first entity and the second entity by creating a first network connection from the application to the first entity and creating a second network connection from the application to the second entity;

wherein the utilizing the information includes:
 identifying, utilizing the first network connection, an alteration made to the data at the first entity,
 sending the altered data to the second entity utilizing the second network connection, and
 storing, by the application, information associated with the second synchronization, wherein the information associated with the second synchronization indicates the altered data;

wherein the information associated with the second synchronization is stored and subsequently used in performing a third synchronization.

2. The computer program product of claim 1, wherein the first entity and the second entity include a first organization and a second organization, respectively.

3. The computer program product of claim 1, wherein the first entity includes a first organization within a first instance of the first system and the second entity includes a second organization within a second instance of the second system.

4. The computer program product of claim 2, wherein at least one of the first system and the second system includes a multi-tenant on-demand database system.

5. The computer program product of claim 1, wherein the computer program product is operable such that a current time is determined, and differences in data between the first and second entities are determined for a time period between a time when the first synchronization was performed and the current time.

6. The computer program product of claim 1, wherein performing the second synchronization includes updating the data on the second entity for a time period between a time when the first synchronization was performed and a current time such that the first entity and the second entity include the same data.

7. The computer program product of claim 1, wherein the computer program product is operable such that one or more objects in the first entity and the second entity have corresponding object identifiers.

8. The computer program product of claim 7, wherein an identifier for an object within the first entity is different from an identifier for the same object within the second entity.

9. The computer program product of claim 8, wherein the identifier corresponding to the object within the first entity is linked within a data structure to the identifier for the same object within the second entity.

10. The computer program product of claim 1, wherein the application is of a multi-tenant on-demand database service.

11. The computer program product of claim 1, wherein the application is a synchronization application.

12. The computer program product of claim 1, wherein the computer program product is operable such that performing the second synchronization further includes synchronizing dependencies between the data within the first entity and the second entity such that the first entity and the second entity include the same data dependencies.

13. A method, comprising:
performing a first synchronization of data between a first entity of a first system and a second entity of a second system, the second system being separate from the first system;

wherein the first synchronization is performed by a processor executing an application located at a location separate from the first entity and the second entity;

wherein the performing the first synchronization includes:
 identifying data located at the first entity,
 sending the data to the second entity, and
 storing the data at the second entity;

receiving, by the application, information indicating what data was synchronized during the first synchronization;

performing, by the application, a second synchronization between the first entity and the second entity, utilizing the information associated with the first synchronization, wherein performing the second synchronization by the application includes the application creating a network connection between the first entity and the second entity by creatin a first network connection from the application to the first entity and creating a second network connection from the application to the second entity;

wherein the utilizing the information includes:
 identifying, utilizing the first network connection, an alteration made to the data at the first entity,
 sending the altered data to the second entity utilizing the second network connection, and
 storing, by the application, information associated with the second synchronization, wherein the information associated with the second synchronization indicates the altered data;

wherein the information associated with the second synchronization is stored and subsequently used in performing a third synchronization.

14. An apparatus, comprising:
a processor which executes instructions in memory to perform the steps of:
 performing a first synchronization of data between a first entity of a first system and a second entity of a second system, the second system being separate from the first system;
 wherein the first synchronization is performed by an application located at a location separate from the first entity and the second entity;
 wherein the performing the first synchronization includes:
  identifying data located at the first entity,
  sending the data to the second entity, and
  storing the data at the second entity;
 receiving, by the application, information indicating what data was synchronized during the first synchronization;
 performing, by the application, a second synchronization between the first entity and the second entity, utilizing the information associated with the first synchronization, wherein performing the second synchronization by the application includes the application creating a network connection between the first entity and the second entity by creating a first network connection from the application to the first entity and creating a second network connection from the application to the second entity;
 wherein the utilizing the information includes:
  identifying, utilizing the first network connection, an alteration made to the data at the first entity, sending the altered data to the second entity utilizing the second network connection, and storing, by the application, information associated with the second synchronization, wherein the information associated with the second synchronization indicates the altered data;

wherein the information associated with the second synchronization is stored and subsequently used in performing a third synchronization.

* * * * *

UNITED STATES PATENT AND TRADEMARK OFFICE
CERTIFICATE OF CORRECTION

| | | |
|---|---|---|
| PATENT NO. | : 8,818,938 B2 | |
| APPLICATION NO. | : 13/018311 | |
| DATED | : August 26, 2014 | |
| INVENTOR(S) | : Luis Maya et al. | |

It is certified that error appears in the above-identified patent and that said Letters Patent is hereby corrected as shown below:

In the Claims:
At column 16, claim number 13, line number 21, please replace "creatin" with --creating--.

Signed and Sealed this
Twenty-third Day of June, 2015

Michelle K. Lee
*Director of the United States Patent and Trademark Office*